(12) United States Patent
Yamamoto

(10) Patent No.: US 8,651,424 B2
(45) Date of Patent: Feb. 18, 2014

(54) DRIVING CONTROLLER OF REMOTE CONTROL EQUIPMENT

(75) Inventor: Michio Yamamoto, Mobara (JP)

(73) Assignee: Futaba Corporation, Mobara-Shi, Chiba-Ken (JP)

( * ) Notice: Subject to any disclaimer, the term of this patent is extended or adjusted under 35 U.S.C. 154(b) by 80 days.

(21) Appl. No.: 13/477,319

(22) Filed: May 22, 2012

(65) Prior Publication Data

US 2012/0298791 A1 Nov. 29, 2012

(30) Foreign Application Priority Data

May 28, 2011 (JP) ................................ 2011-119805

(51) Int. Cl.
*G05D 1/00* (2006.01)

(52) U.S. Cl.
USPC ........................................ 244/195; 244/17.13

(58) Field of Classification Search
USPC ............ 244/189, 190, 194, 195, 17.13, 76 R; 701/2, 3, 4
See application file for complete search history.

(56) References Cited

U.S. PATENT DOCUMENTS

| | | | | |
|---|---|---|---|---|
| 3,794,271 | A * | 2/1974 | Barron et al. ................ | 244/3.15 |
| 4,043,526 | A * | 8/1977 | Donley et al. ................ | 244/194 |
| 4,148,452 | A * | 4/1979 | Niessen et al. ................ | 244/195 |
| 4,236,685 | A * | 12/1980 | Kissel ........................... | 244/223 |
| 4,980,835 | A * | 12/1990 | Lawrence et al. ................ | 701/4 |
| 5,170,969 | A * | 12/1992 | Lin ................................ | 244/194 |
| 5,799,901 | A * | 9/1998 | Osder ........................ | 244/17.13 |
| 5,935,177 | A * | 8/1999 | Cox et al. .......................... | 701/9 |
| 6,092,919 | A * | 7/2000 | Calise et al. .................... | 700/45 |
| 6,669,139 | B2 * | 12/2003 | Kubica ......................... | 244/76 R |
| 7,645,970 | B2 * | 1/2010 | Adams et al. ................ | 244/3.15 |

* cited by examiner

*Primary Examiner* — Tien Dinh
*Assistant Examiner* — Keith L Dixon
(74) *Attorney, Agent, or Firm* — Bacon & Thomas, PLLC

(57) ABSTRACT

A driving controller of remote control equipment includes a yaw axis angular velocity detecting unit for outputting a yaw axis angular velocity as a yaw axis angular velocity signal; a main rotor RPM detecting unit for outputting a main rotor RPM as a main rotor RPM signal; and a phase control unit for detecting a phase deviation in a roll axis and a pitch axis based on the yaw axis angular velocity signal and the main rotor RPM signal, and generating a roll and a pitch control signal by correcting a roll and a pitch operation signal by the phase deviation. The driving controller further includes an actuator control unit for generating a roll and a pitch actuator driving signal respectively based on the roll and the pitch control signal, and outputting the generated roll and pitch actuator driving signals to a roll and a pitch control actuator, respectively.

4 Claims, 9 Drawing Sheets

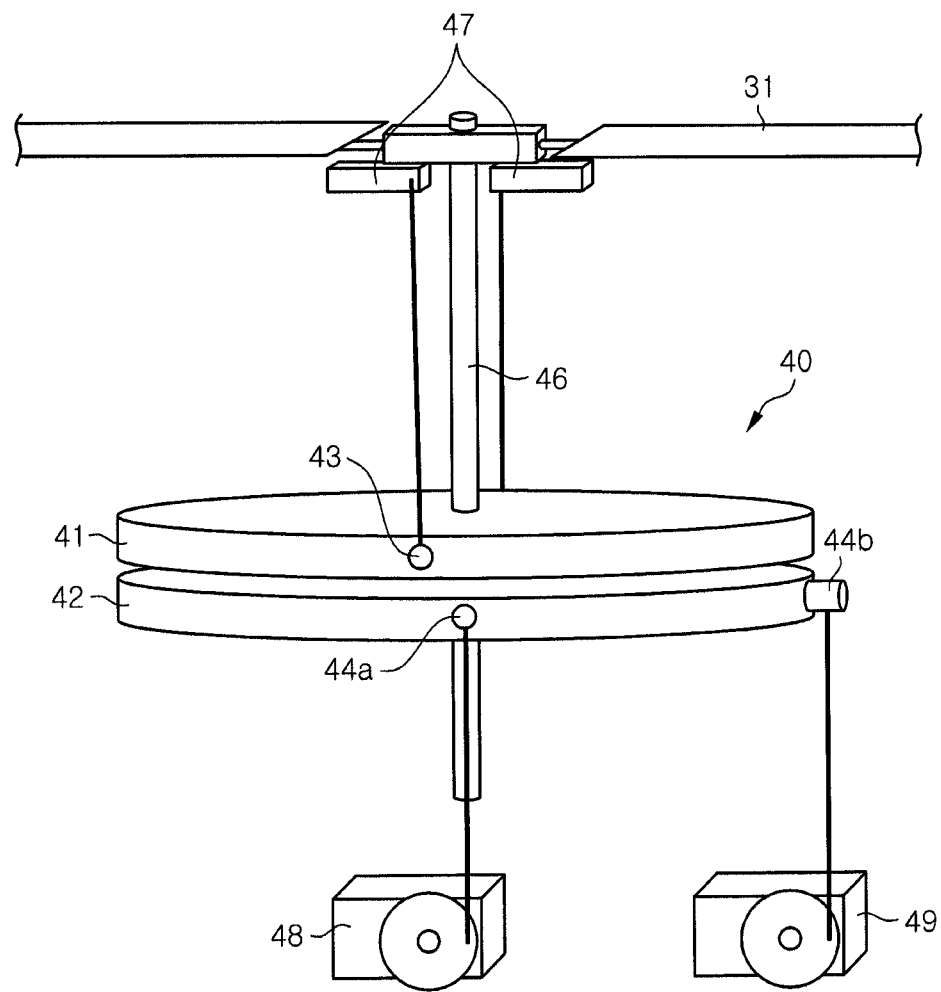

DRIVING CONTROLLER OF REMOTE CONTROL EQUIPMENT

FIELD OF THE INVENTION

The present invention relates to a driving controller of remote control equipment, and more particularly, to a driving controller adapted for a remote control helicopter such as a model helicopter, an aerial photography helicopter, a crop-dusting helicopter or the like.

BACKGROUND OF THE INVENTION

A remote control helicopter such as a model helicopter 30 or the like has a basic structure as shown in FIG. 5 and performs a driving control with a main rotor 31 attached to a fuselage and a tail rotor 32 attached to a tail.

By rotating the main rotor 31, a lift force is produced, and a pitch angle and ascending, descending, forward, backward, left and right movements of the model helicopter 30 can be controlled. In addition, the tail rotor 32 counteracts a reaction torque produced by the rotation of the main rotor 31 and is used to control the model helicopter 30 to be horizontally rotated.

The fuselage of the model helicopter 30 is rotated about a back-and-forth axis (roll axis) to drive the fuselage in the left and right directions. The fuselage is rotated about a left-and-right axis (pitch axis) to drive the fuselage in the forward and backward directions. The fuselage is rotated about a vertical axis (yaw axis) to rotationally drive the fuselage in the horizontal plane.

FIG. 6 is a schematic view showing a control system of the main rotor. The main rotor 31 is supported by a circular support shaft 46. A swash plate 40 is concentrically placed on the support axis 46. The swash plate 40 includes upper and lower disc-shaped parts 41 and 52 and has a sliding bearing structure so that the swash plate 40 can be moved with respect to the support shaft 46. An upper disc-shaped part 41 has upper control bars 43 which are located at 180° opposite sides and are respectively connected to left and right pitch angle control arms 47 of the main rotor 45 in order to control a pitch angle of the main rotor 45. In addition, the lower disc-shaped part 42 has lower control bars 44a and 44b which are arranged at 90° to each other and are connected to a roll control actuator 48 and a pitch control actuator 49, respectively.

From the viewpoint of the control system, the forward and backward movements of the model helicopter are controlled by the pitch control actuator 49. The left and right movements of the model helicopter are controlled by the roll control actuator 48.

In addition, FIG. 6 shows control of a collective pitch to control the ascending and descending movements of the model helicopter.

Considering the driving of the model helicopter in terms of actions (functions) of physical forces, if the model helicopter is moved (rolled) in the left and right direction, pitch angles of two rotor blades of the main rotor are changed when the main rotor is in a position "A" shown in FIG. 7B. A difference between the pitch angles of the two rotor blades causes a change in a lift force applied to the model helicopter. Such a lift force change is generated when a phase is retarded by 90 degrees due to a Coriolis force produced by the rotation of the main rotors. That is, when the main rotor is in a position "B", this lift force change is generated, and the model helicopter is controlled to be driven in the left and right direction.

In addition, since the model helicopter has no self-control stability of a yaw axis, a gyrocompass device is indispensable to stabilization of driving control of the model helicopter. If there is no gyrocompass, the nose of the model helicopter is horizontally swung.

In order to achieve stable driving control of the model helicopter, Japanese Patent Application Publication No. H11-282502 discloses a technique for improving a detection precision of a yaw axis angular velocity detecting sensor, thus increasing the precision of yaw control.

In control of a model helicopter, control of rotating a body of the model helicopter around a yaw axis at a high speed is referred to as "pirouette." When the body is controlled to rotate or pirouette about the yaw axis, a deviation occurs in a Coriolis force related to roll operation or pitch operation. This deviation is varied depending on a relationship between an angular velocity of the yaw axis (angular velocity of pirouette) of the model helicopter and a rotational speed (RPM) of a main rotor.

For example, referring to FIG. 7A, if roll operation is performed when a rotational direction s' of the main rotor is to the same as a pirouette direction p', the roll operation needs to be actually reflected when the main rotor is in a position "A" since the model helicopter is rotated by pirouette. However, the roll operation is actually reflected when the main rotor is in position "A'," whereby roll and pitch operations deviates from the intention of an operator.

As a result, if the roll and pitch operations are performed when the model helicopter is rotated about the yaw axis, a phase deviation occurs in a roll axis and a pitch axis so that the roll and pitch operations deviates from the intention of an operator.

SUMMARY OF THE INVENTION

In view of the above, the present invention provides a driving controller which is capable of carrying out roll and pitch control by correcting phase deviations of a roll axis and a pitch axis such that roll and pitch operations can correctly be performed even when a remote control helicopter such as a model helicopter or the like is rotated about a yaw axis.

In accordance with an aspect of the present invention, there is provided a driving controller of remote control equipment, including a yaw axis angular velocity detecting unit for outputting a yaw axis angular velocity as a yaw axis angular velocity signal; a main rotor RPM detecting unit for outputting a main rotor RPM as a main rotor RPM signal; a phase control unit for detecting a phase deviation in a roll axis and a pitch axis based on the yaw axis angular velocity signal and the main rotor RPM signal, and generating a roll control signal and a pitch control signal by correcting a roll operation signal and a pitch operation signal by the phase deviation; and an actuator control unit for generating a roll actuator driving signal and a pitch actuator driving signal respectively based on the roll control signal and the pitch control signal generated by the phase control unit, and outputting the generated roll and pitch actuator driving signals to a roll control actuator and a pitch control actuator, respectively.

The phase control unit may include a roll operation signal detecting unit for detecting the roll operation signal; a pitch operation signal detecting unit for detecting the pitch operation signal; a phase angle calculating unit for calculating a phase deviation signal based on the yaw axis angular velocity signal and the main rotor RPM signal, the phase deviation signal indicating the phase deviation in the roll axis and the pitch axis; and a controlled variable calculating unit for calculating a roll operation amount and a pitch operation amount based on the roll operation signal, the pitch operation signal and the phase deviation signal, and outputting the calculated amounts as the roll control signal and the pitch control signal.

The driving controller may further include a roll axis angular velocity detecting unit for detecting an angular velocity of the roll axis and outputting the detected angular velocity as a roll axis angular velocity signal; and a pitch axis angular velocity detecting unit for detecting an angular velocity of the pitch axis and outputting the detected angular velocity as a pitch axis angular velocity signal, wherein the roll operation signal detecting unit adds the roll axis angular velocity signal to the roll operation signal and the pitch operation signal detecting unit adds the pitch axis angular velocity signal to the pitch operation signal.

In accordance with the aspect of the present invention, correct roll and pitch operations can be achieved when a model helicopter is rotated about a yaw axis. In addition, more precise and stable control can be achieved in consideration of a roll axis angular velocity and a pitch axis angular velocity.

BRIEF DESCRIPTION OF THE DRAWINGS

The objects and features of the present invention will become apparent from the following description of embodiments, given in conjunction with the accompanying drawings, in which:

FIG. 6 is a schematic view showing a control system of a main rotor of a model helicopter.

DETAILED DESCRIPTION OF THE EMBODIMENTS (First Embodiment)

Figure 1:
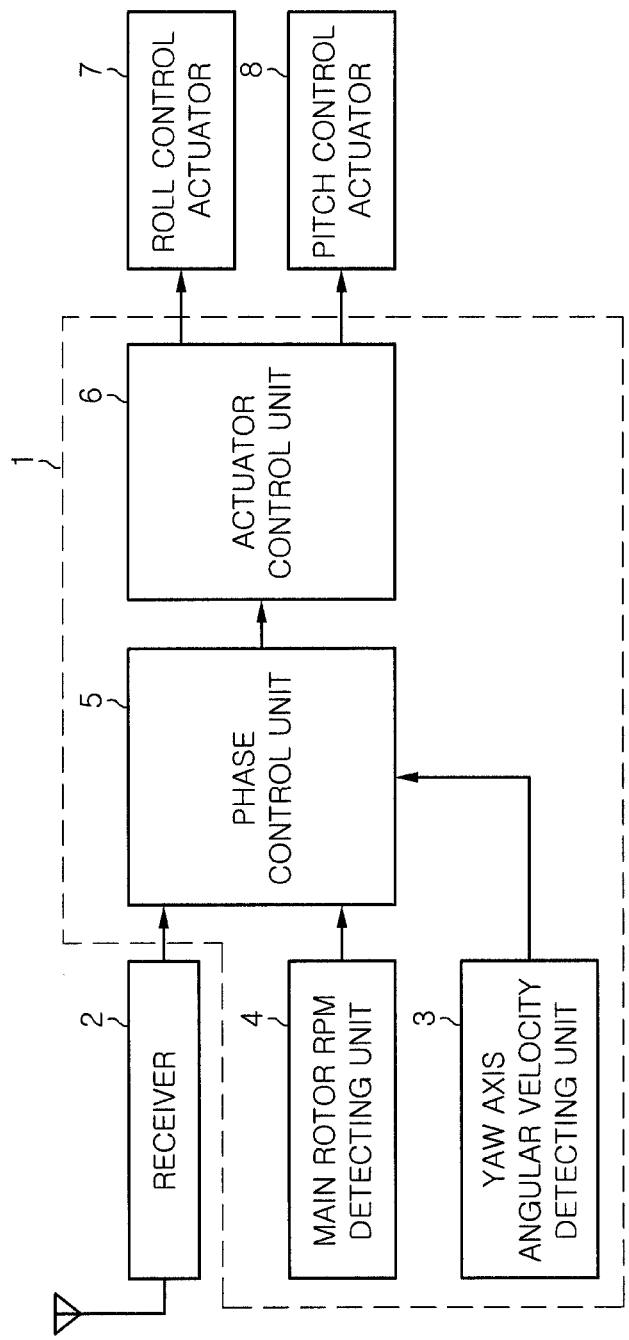
FIG. 1 is a block diagram showing a configuration of a driving controller in accordance with a first embodiment of the present invention.

A driving controller in accordance with a first embodiment of the present invention will now be described with reference to FIGS. 1 and 2. FIG. 1 is a block diagram showing a configuration of a driving controller 1 in accordance with the first embodiment.

The driving controller 1 includes a yaw axis angular velocity detecting unit 3; a main rotor RPM detecting unit 4; a phase control unit 5; and an actuator control unit 6. A receiver 2 receives a radio wave from a transmitter (not shown) and demodulates it into an operation signal and outputs same to the phase control unit 5.

The yaw axis angular velocity detecting unit 3 includes a yaw axis angular velocity detecting sensor which detects a yaw axis angular velocity of, e.g., a model helicopter and outputs the detected result, as a yaw axis angular velocity signal, to the phase control unit 5.

The main rotor RPM detecting unit 4 includes a main rotor RPM counter which detects the RPM of a main rotor and outputs the detected result, as a main rotor RPM signal, to the phase control unit 5. The main rotor RPM detecting unit 4 may be configured to recognize a main rotor RPM set by an operator as a detected value and output the recognized result, as the main rotor RPM signal, to the phase control unit 5.

Based on the yaw axis angular velocity signal and the main rotor RPM signal, the phase control unit 5 calculates a phase deviation corresponding to a phase shift in each of a roll axis and a pitch axis due to the rotation of the model helicopter about a yaw axis. Then, a roll operation signal and a pitch operation signal, which will be described later, are corrected based on the calculated phase deviation. A roll control signal and a pitch control signal produced by the correction are outputted to the actuator control unit 6.

The actuator control unit 6 generates a roll actuator driving signal corresponding to a roll control actuator based on the roll control signal and outputs it to the roll control actuator 7. Then, a roll operation of the model helicopter is controlled by driving a swash plate (not shown) through the roll control actuator 7.

This is true of the pitch control signal to thereby control a pitch operation of the model helicopter through a pitch control actuator 8.

Figure 2:
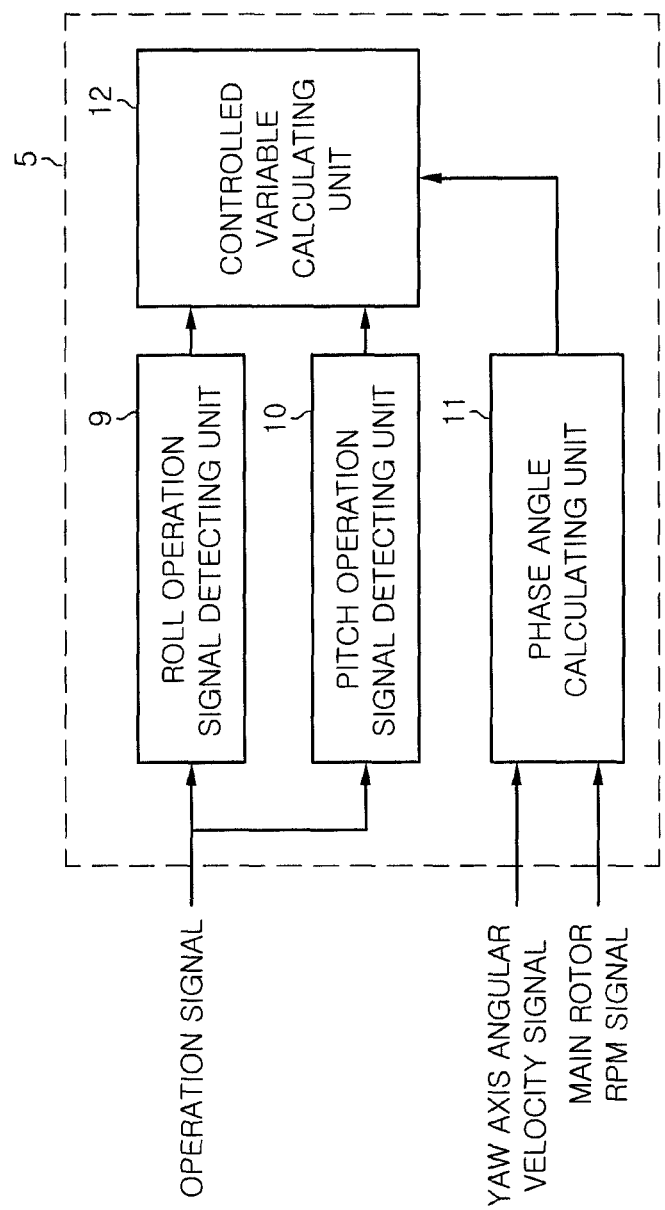
FIG. 2 is a block diagram showing a configuration of a phase control unit in accordance with the first embodiment of the present invention.

FIG. 2 is a block diagram showing a configuration of the phase control unit 5. The phase control unit 5 includes a roll operation signal detecting unit 9, a pitch operation signal detecting unit 10, a phase angle calculating unit 11 and a controlled variable calculating unit 12.

The roll operation signal detecting unit 9 extracts the roll operation signal from an operation signal inputted through the receiver and outputs it to the controlled variable calculating unit 12. The pitch operation signal detecting unit 10 extracts the pitch operation signal from the operation signal inputted through the receiver and outputs it to the controlled variable calculating unit 12.

The phase angle calculating unit 11 generates a phase deviation signal by calculating a phase deviation in each of the roll axis and the pitch axis due to the rotation of the model helicopter about the yaw axis based on the yaw axis angular velocity signal inputted from the yaw axis angular velocity detecting unit 3 and the main rotor RPM signal inputted from the main rotor RPM detecting unit 4. The phase deviation signal is inputted to the controlled variable calculating unit 12 to correct the roll operation signal and the pitch operation signal. The controlled variable calculating unit 12 outputs the corrected roll control signal and pitch control signal to the actuator control unit 6.

Figure 4A:
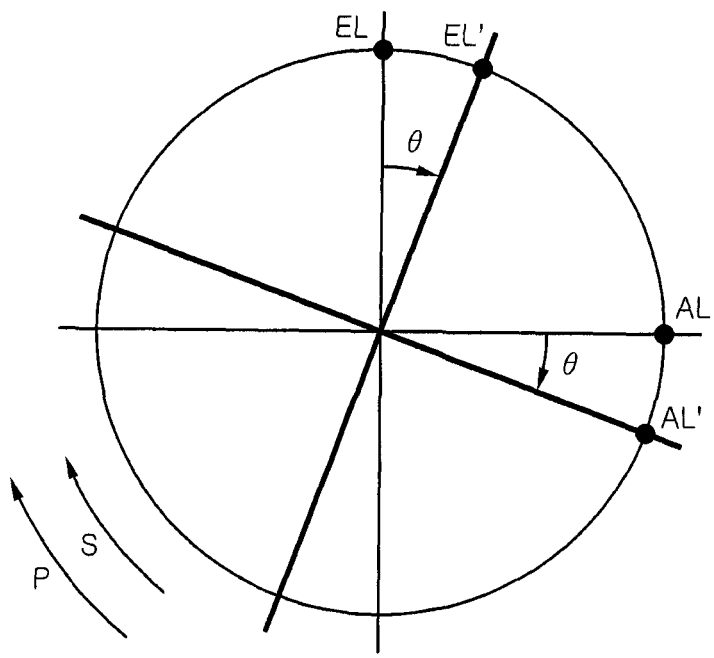
FIGS. 4A and 4B are schematic views showing a controlled variable when phases of a roll axis and a pitch axis are deviated.
Figure 4B:
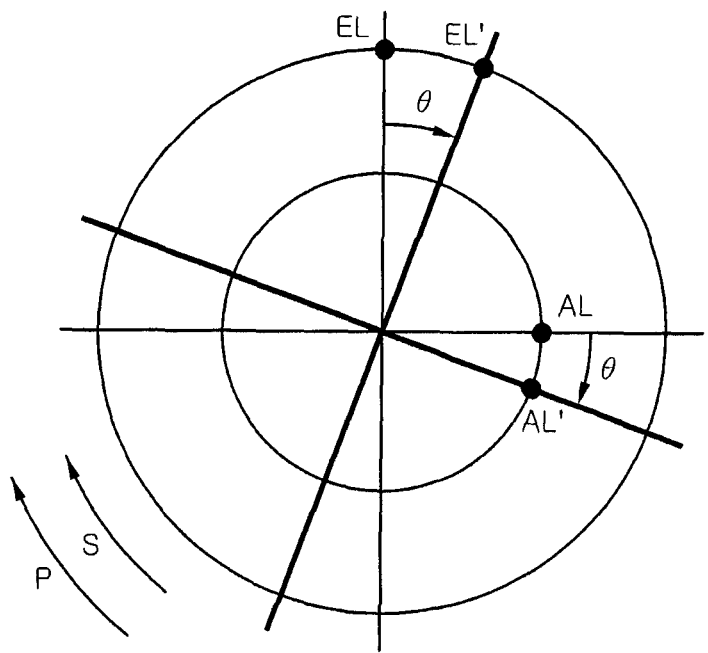
Figure 5:
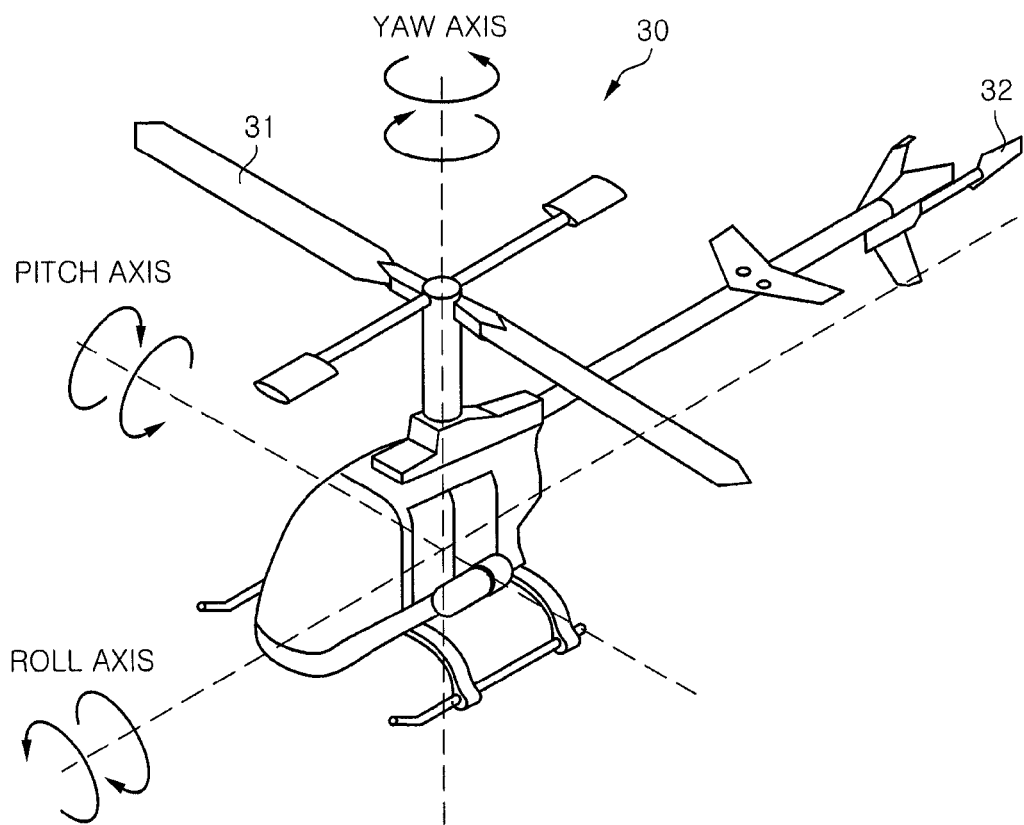
FIG. 5 shows a body of a model helicopter and control axes.
Figure 7A:
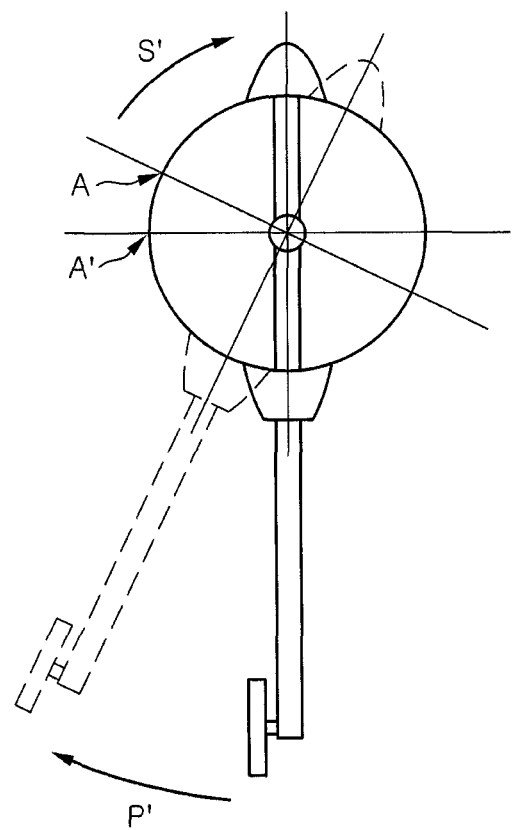
FIGS. 7A and 7B are schematic views showing a phase deviation of a roll axis and a pitch axis when pirouette is performed.
Figure 7B:
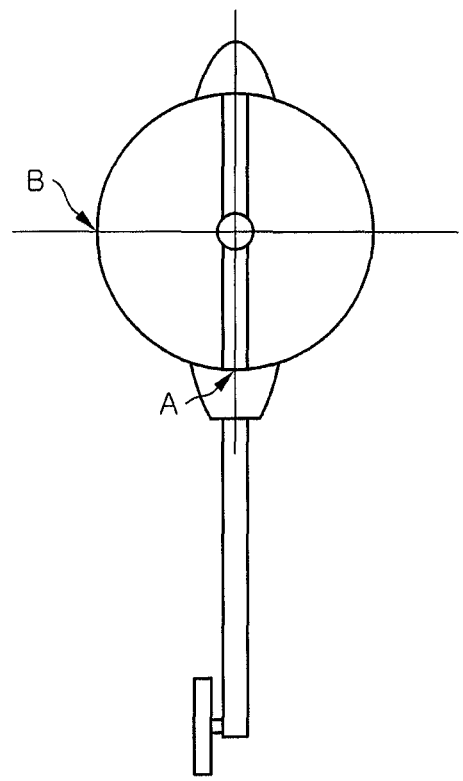

The correction of the roll operation signal and the pitch operation signal will be described in detail with reference to FIGS. 4A and 4B. In FIGS. 4A and 4B, a radius of the circle denotes a magnitude of operation.

In the model helicopter, in clockwise pirouette, it is assumed that an angular velocity is "p (deg/sec)" and the number of revolutions of a main rotor is "s (rpm)". Here, time "r (sec)" required to rotate the main rotor by 90 degrees (one quarter rotation) is obtained by using the following Eq. 1.

$$r=(60/s)\times(1/4) \quad \text{(Eq. 1)}$$

A phase deviation Φ (deg) of the roll axis and pitch axis generated by pirouette for the time r (sec) is obtained by using the following Eq. 2.

$$\phi = p \times r \quad \text{(Eq. 2)}$$

In Eqs. 1 and 2, it is assumed that the clockwise direction is a positive direction and the counterclockwise direction is a negative direction. In this case, a pirouette direction and a main rotor rotational direction can be normalized by defining a phase deviation in the clockwise direction as positive polarity and a phase deviation in the counterclockwise direction as negative polarity.

The phase deviation Φ (deg) is reflected in actual control of the main rotor. Assuming that a roll operation amount is "AL" and a pitch operation amount is "EL", a roll operation amount AL' and a pitch operation amount EL' when the phase deviation Φ (deg) is generated are obtained by using a vector calculation of the following Eq. 3.

$$AL'=AL\times\cos\phi+EL\times\sin\phi$$

$$EL'=EL\times\cos\phi-AL\times\sin\phi \quad \text{(Eq. 3)}$$

By respectively applying the roll operation amount AL' and the pitch operation amount EL' to the roll and the pitch control actuator 7 and 8, the correction using the roll axis and the pitch axis as the center can be carried out even when the model helicopter is rotated about the yaw axis, so that the correct roll and pitch operations can be achieved.

Although it is assumed in FIG. 4A that the roll operation amount AL is equal to the pitch operation amount EL, the relationship of Eq. 3 can be established even if the roll operation amount AL is actually different from the pitch operation amount EL, as shown in FIG. 4B.

(Second Embodiment)

Figure 3A:
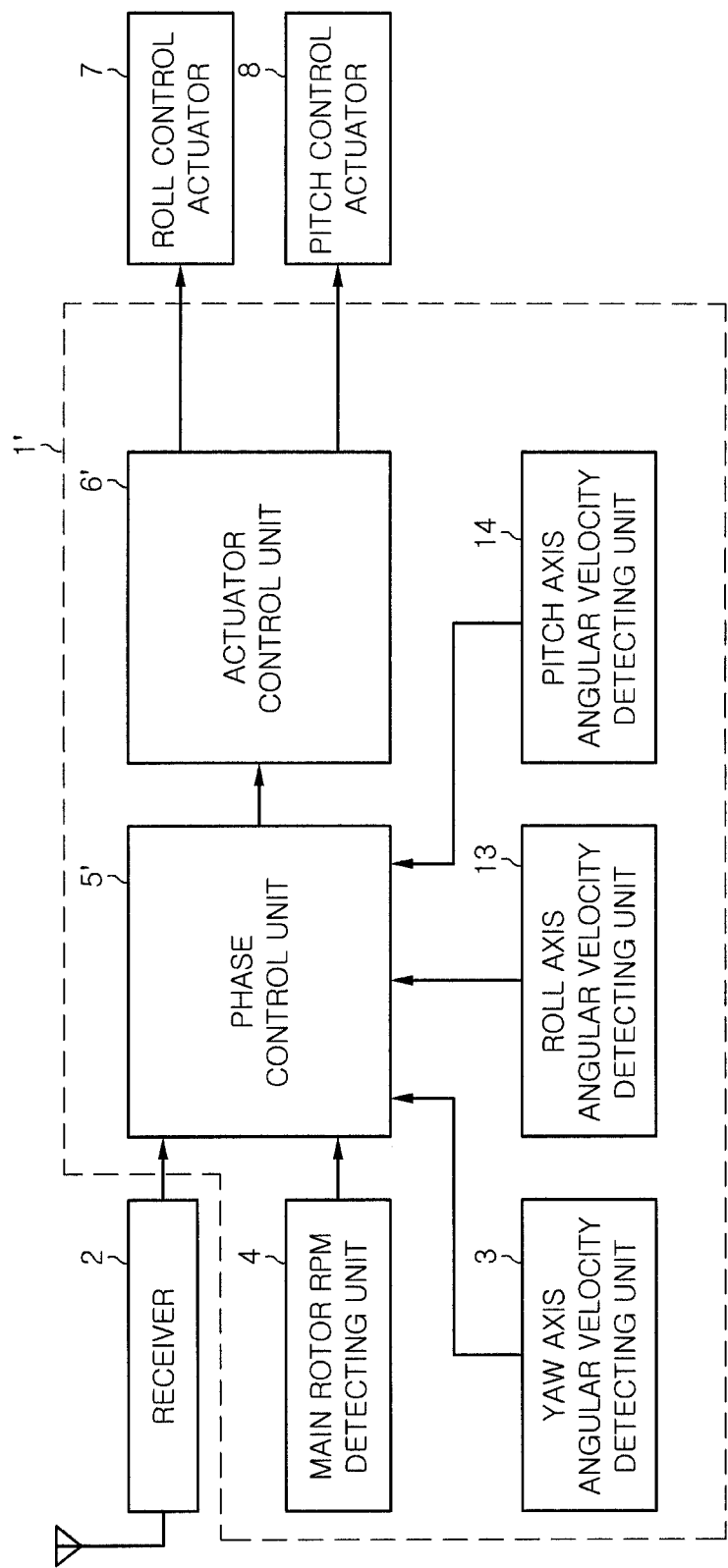
FIGS. 3A and 3B are block diagrams showing a configuration of a driving controller in accordance with a second embodiment of the present invention.
Figure 3B:
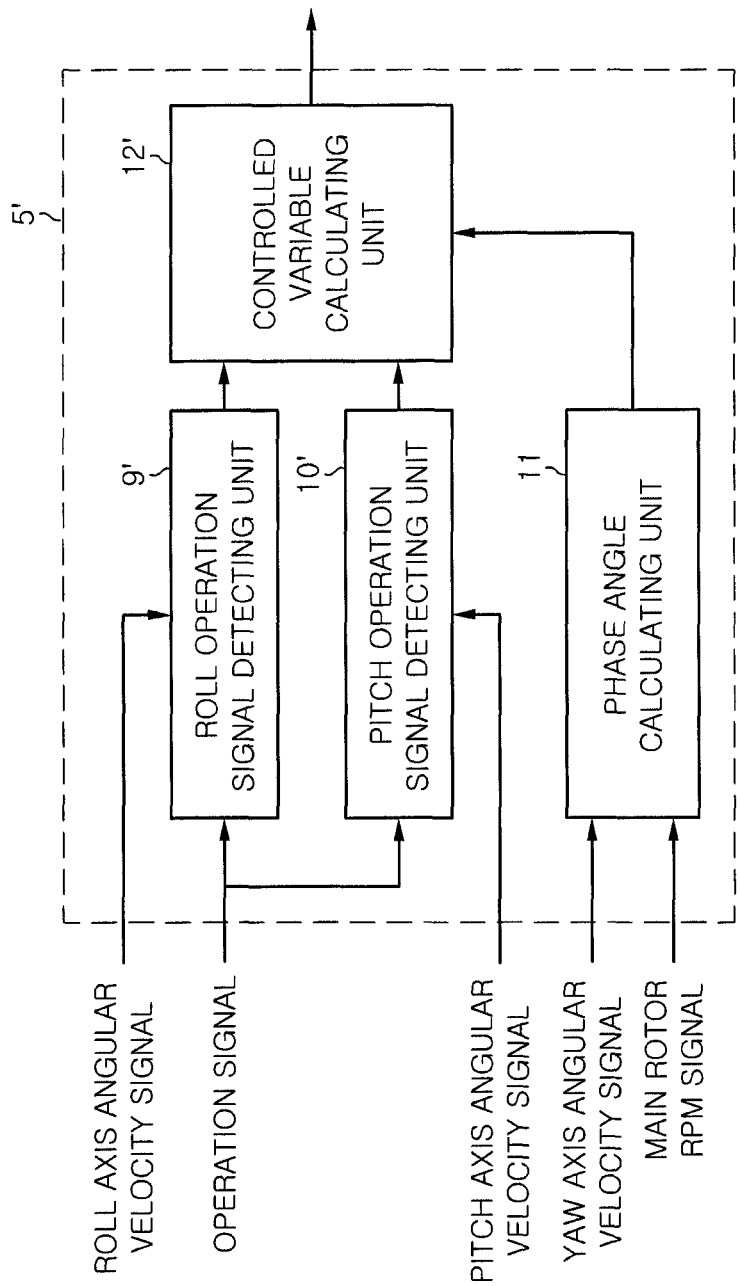

A driving controller in accordance with a second embodiment of the present invention will be now described with reference to FIGS. 3A and 3B.

In a driving controller 1' in accordance with the second embodiment, the same elements as those in the first embodiment are denoted by the same reference numerals, and therefore, redundant explanation thereof will be omitted and only elements different from those in the first embodiment will be described.

The driving controller 1' includes a roll axis angular velocity detecting unit 13 and a pitch axis angular velocity detecting unit 14 in addition to the yaw axis angular velocity detecting unit 3.

The roll axis angular velocity detecting unit 13 includes a roll axis angular velocity sensor which detects a roll axis angular velocity of a model helicopter and outputs it, as a roll axis angular velocity signal, to a roll operation signal detecting unit 9'. The roll operation signal detecting unit 9' adds the roll axis angular velocity signal to a roll operation signal and outputs a resultant signal of thus obtained to a controlled variable calculating unit 12'.

Similarly, the pitch axis angular velocity detecting unit 14 includes a pitch axis angular velocity sensor which detects a pitch axis angular velocity of the model helicopter and outputs it, as a pitch axis angular velocity signal, to a pitch operation signal detecting unit 10'. The pitch operation signal detecting unit 10' adds the pitch axis angular velocity signal to a pitch operation signal and outputs a resultant signal of thus obtained to the controlled variable calculating unit 12'.

In the second embodiment, the roll axis angular velocity signal and the pitch axis angular velocity signal are reflected in the roll operation amount and the pitch operation amount, respectively. Accordingly, it is possible to stabilize the driving control by correcting a phase deviation with higher precision.

In addition, it is also possible to achieve more stabilized control by reflecting the phase deviation in each of the roll axis and pitch axis due to the rotation of the model helicopter about the yaw axis to the roll axis angular velocity signal and the pitch axis angular velocity signal.

While the invention has been shown and described with respect to the embodiments, it will be understood by those skilled in the art that various changes and modifications may be made without departing from the scope of the invention as defined in the following claims.

What is claimed is:

1. A driving controller of remote control equipment, comprising:
a yaw axis angular velocity detecting unit for outputting a yaw axis angular velocity as a yaw axis angular velocity signal;
a main rotor RPM detecting unit for outputting a main rotor RPM as a main rotor RPM signal;
a phase control unit for detecting a phase deviation in a roll axis and a pitch axis based on the yaw axis angular velocity signal and the main rotor RPM signal, and generating a roll control signal and a pitch control signal by correcting a roll operation signal and a pitch operation signal by the phase deviation; and
an actuator control unit for generating a roll actuator driving signal and a pitch actuator driving signal respectively based on the roll control signal and the pitch control signal generated by the phase control unit, and outputting the generated roll and pitch actuator driving signals to a roll control actuator and a pitch control actuator, respectively.

2. The driving controller of claim 1, wherein the phase control unit includes;
a roll operation signal detecting unit for detecting the roll operation signal;
a pitch operation signal detecting unit for detecting the pitch operation signal;
a phase angle calculating unit for calculating a phase deviation signal based on the yaw axis angular velocity signal and the main rotor RPM signal, the phase deviation signal indicating the phase deviation in the roll axis and the pitch axis; and
a controlled variable calculating unit for calculating a roll operation amount and a pitch operation amount based on the roll operation signal, the pitch operation signal and the phase deviation signal, and outputting the calculated amounts as the roll control signal and the pitch control signal.

3. The driving controller of claim 1, further comprising:
a roll axis angular velocity detecting unit for detecting an angular velocity of the roll axis and outputting the detected angular velocity as a roll axis angular velocity signal; and
a pitch axis angular velocity detecting unit for detecting an angular velocity of the pitch axis and outputting the detected angular velocity as a pitch axis angular velocity signal,
wherein the roll operation signal detecting unit adds the roll axis angular velocity signal to the roll operation signal and the pitch operation signal detecting unit adds the pitch axis angular velocity signal to the pitch operation signal.

4. The driving controller of claim 2, further comprising:
a roll axis angular velocity detecting unit for detecting an angular velocity of the roll axis and outputting the detected angular velocity as a roll axis angular velocity signal; and
a pitch axis angular velocity detecting unit for detecting an angular velocity of the pitch axis and outputting the detected angular velocity as a pitch axis angular velocity signal, wherein the roll operation signal detecting unit adds the roll axis angular velocity signal to the roll operation signal and the pitch operation signal detecting unit adds the pitch axis angular velocity signal to the pitch operation signal.

* * * * *